(12) United States Patent
Wang et al.

(10) Patent No.: US 10,852,795 B2
(45) Date of Patent: Dec. 1, 2020

(54) METHOD FOR SYSTEM POWER MANAGEMENT AND COMPUTING SYSTEM THEREOF

(71) Applicant: GIGA-BYTE TECHNOLOGY CO., LTD., New Taipei (TW)

(72) Inventors: Wei-Cheng Wang, New Taipei (TW); Chia-Cheng Chang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 133 days.

(21) Appl. No.: 16/046,987

(22) Filed: Jul. 26, 2018

(65) Prior Publication Data

US 2019/0179386 A1 Jun. 13, 2019

(30) Foreign Application Priority Data

Dec. 7, 2017 (TW) .............................. 106143024 A

(51) Int. Cl.
G06F 1/26 (2006.01)
G06F 1/3206 (2019.01)
G06F 1/30 (2006.01)

(52) U.S. Cl.
CPC ................ *G06F 1/263* (2013.01); *G06F 1/30* (2013.01); *G06F 1/3206* (2013.01)

(58) Field of Classification Search
CPC ........... G06F 1/263; G06F 1/30; G06F 1/3206
See application file for complete search history.

(56) References Cited

U.S. PATENT DOCUMENTS

| | | | |
|---|---|---|---|
| 2006/0082222 A1* | 4/2006 | Pincu ...................... | H02J 1/102 307/29 |
| 2008/0155284 A1* | 6/2008 | Shimohata ................ | G06F 1/28 713/300 |

(Continued)

FOREIGN PATENT DOCUMENTS

| | | |
|---|---|---|
| TW | 201500902 A | 1/2015 |
| TW | 201702799 A | 1/2017 |

OTHER PUBLICATIONS

Search Report issued in corresponding EP patent application dated Feb. 12, 2019.

(Continued)

*Primary Examiner* — Jaweed A Abbaszadeh
*Assistant Examiner* — Hyun Soo Kim
(74) *Attorney, Agent, or Firm* — Idea Intellectual Limited; Margaret A. Burke; Sam T. Yip

(57) ABSTRACT

A method for system power management includes steps of detecting power output of plural power-supplying units (PSUs) and power consumption of plural computing node, so as to indirectly obtain real-time auxiliary power consumption of an auxiliary unit and continuously update maximum auxiliary power consumption; when one of the PSUs is malfunctioned, renewing the maximum sum of the power output of the other PSUs, and applying the difference of the renewed maximum sum of the power outputs and the maximum auxiliary power consumption as a first sum of the node power consumptions of the computing nodes; finally, according to the first sum of the node power consumptions, cutting down the power consumption of at least one of the computing nodes to a first node power consumption.

16 Claims, 9 Drawing Sheets

(56) References Cited

U.S. PATENT DOCUMENTS

| | | |
|---|---|---|
| 2010/0058091 A1 | 3/2010 | Lambert et al. |
| 2011/0314318 A1* | 12/2011 | Sawai ............... H05K 7/1498 713/340 |
| 2014/0108831 A1* | 4/2014 | Dube ............... G06F 1/3206 713/320 |
| 2015/0169030 A1* | 6/2015 | Coxe ............... G06F 1/3225 713/324 |
| 2015/0177813 A1* | 6/2015 | Bailey ............... G06F 1/3234 713/320 |

OTHER PUBLICATIONS

Office Action of corresponding Korean Patent Application No. KR20170044415A dated Feb. 18, 2020.

* cited by examiner

US 10,852,795 B2

METHOD FOR SYSTEM POWER MANAGEMENT AND COMPUTING SYSTEM THEREOF

CROSS-REFERENCE TO RELATED APPLICATION

This non-provisional application claims priority under 35 U.S.C. § 119(a) to Patent Application No. 106143024 filed in Taiwan, R.O.C. on Dec. 7, 2017, the entire contents of which are hereby incorporated by reference.

FIELD OF THE INVENTION

This disclosure relates to control of multiple power-supplying units, and in particular, to a method for system power management and a computing system adopting the method.

BACKGROUND

Usually, a data server system or a high-speed computing system is equipped with two or more power-supplying units (PSUs) to form a redundant power supply array, to fulfil the power consumption requirement in which each of the PSU is a backup unit of the other one. In the redundant power supply array, every single PSU can independently fulfil the power consumption requirement of the system. For example, when a maximum power consumption of the system is 2000 W, usually each PSU of the system is able to output a maximum power output of 2200 W. When anyone of the PSU is malfunctioned, the remaining PSU is able to maintain system operation. However, if all the PSUs are normal, high redundant power output capacity becomes idle resource; in the example mentioned above, 2200 W redundant power output capacity becomes idle and unnecessary when both PSUs are normal.

To solve the above problem, an approach in the art is to utilize PSUs having lower individual maximum power output, and the maximum sum of the power outputs of these PSUs is able to fulfil the maximum power consumption of the system. The individual maximum power output of each PSU is efficiently used and less redundant power output capacity is idle. In this approach, when a single PSU is malfunctioned, the system switches this malfunctioned PSU to be off-line, and switches an operation mode of the system to an ultra-low frequency mode (ULFM). At this time, the system performance is lowered rapidly. However, power consumption due to data access request or system service request from external is not always reduced simultaneously, and results in unstable system operation.

SUMMARY OF THE INVENTION

In view of the above problems, this disclosure is directed to a method for system power management and computing system adopting the method, to solve the problems of the high redundant power output capacity or the unstable system operation under low frequency mode.

This disclosure provides a method for system power management, comprises steps of: detecting a maximum sum of power outputs of a plurality of power-supplying units; respectively detecting an individual real-time power output of each of the power-supplying units and a real-time node power consumption of each of a plurality of computing nodes, adding up the individual real-time power outputs to a sum of a real-time power output and adding up the real-time node power consumptions to a sum of real-time power consumptions, and applying the difference between the sum of the real-time power outputs and the sum of the real-time power consumptions as a real-time auxiliary power consumption of an auxiliary unit; continuously obtaining the real-time auxiliary power consumption to update a maximum auxiliary power consumption of the auxiliary unit; detecting whether each of the power-supplying units is malfunctioned, and when one of the power-supplying units is malfunctioned renewing the maximum sum of the power outputs of the other power-supplying units; and applying the difference of the renewed maximum sum of the power outputs and the maximum auxiliary power consumption as a first sum upper limit of the node power consumptions of the computing nodes; and cutting down the power consumption of at least one of the computing nodes to a first node power consumption upper limit.

After cutting down the power consumption of the at least one of the computing nodes to the first node power consumption upper limit, the method further comprises: obtaining the maximum auxiliary power consumption of the auxiliary unit within a designated time period; after the designated time period, determining whether the maximum auxiliary power consumption within the designated time period is smaller than the maximum auxiliary power consumption before the designated time period; if yes, obtain a second sum upper limit of the node power consumptions according to the maximum auxiliary power consumption within the designated time period; and according to the second sum upper limit of the node power consumptions, adjusting the node power consumption of the at least one of the computing node to a second node power consumption upper limit.

In one embodiment, cutting down the power consumption of the at least one of the computing nodes to the first node power consumption upper limit comprises equally distributing the first sum upper limit of the node power consumptions to the computing nodes.

In one embodiment, cutting down the power consumption of the at least one of the computing nodes to the node power consumption comprises categorizing the computing nodes into a primary group and a secondary group; and applying a difference between the first sum upper limit of the nod power consumption and the real-time node power consumptions of the primary group, and equally distributing the difference to the secondary group.

In one embodiment, if all the power-supplying units recover from being malfunctioned, stopping cutting down the power consumption of the at least one of the computing nodes to the first node power consumption upper limit.

In one embodiment, after one of the power-supplying units is malfunctioned, if the sum of the real-time power outputs is not larger than the renewed maximum sum of the power outputs, maintaining the real-time node power consumption of each of the computing nodes.

In one embodiment, cutting down the power consumption of the at least one of the computing nodes to the first node power consumption upper limit comprises categorizing the computing nodes into a primary group and a secondary group; and determining whether a power control mode is enabled; when the power control mode is enabled, applying a difference between the first sum upper limit of the node power consumption and the real-time node power consumptions of the primary group and equally distributing the difference to the secondary group; when the power control mode is not enabled; and equally distributing the first sum upper limit of the node power consumptions to the primary group and the secondary group.

In one embodiment, detecting whether each of the power-supplying units is malfunctioned comprises continuously receiving a normal status signal from each of the power-supplying units; and when the normal status signal is interrupted, determining that the corresponding power-supplying unit is malfunctioned.

In one embodiment, detecting whether each of the power-supplying units is malfunctioned comprises the power-supplying unit issuing an abnormal status signal when the power-supplying unit is malfunctioned, and determining the power-supplying unit is malfunctioned after receiving the abnormal status signal.

This disclosure also provides a computing system adopting the method for system power management. The computing system comprises a plurality of power-supplying units, a plurality of computing node, at least one auxiliary unit and a chassis management control.

The PSUs respectively provide electricity, wherein each of the PSUs including an individual maximum power output to be added up to a maximum of the power outputs of the power-supplying units. Each of the power-supplying units is arranged to return the individual real-time power output, and the individual real-time power outputs of the power-supplying units are added up to a sum of the real-time total power outputs. The computing nodes are respectively equipped with data processing function and obtain the electricity from the power-supplying units. Each of the computing nodes is arranged to return a real-time power consumption, and the real-time power consumptions of the computing nodes are added up to a sum of the real-time power consumptions. The auxiliary unit obtains the electricity from the power-supplying units, and the auxiliary unit includes a real-time auxiliary power consumption and a maximum auxiliary power consumption. The chassis management control is electrically connected to and controls the power-supplying units and computing nodes to obtain a maximum sum of the power outputs, a sum of the real-time power outputs, and a sum of the real-time power consumptions. The chassis management control applies a difference between the sum of the real-time power outputs and the sum of the real-time power consumptions as a real-time auxiliary power consumption, and continuously updates the maximum auxiliary power consumption according the variation of the real-time auxiliary power consumption.

When the chassis management control detects that one of the power-supplying units is malfunctioned, the chassis management control renews the maximum sum of the power outputs of the other power-supplying units and applies a difference between the renewed maximum sum of the power outputs and the maximum auxiliary power consumption as a first sum upper limit of the node power consumptions of the computing nodes.

Then the chassis management control cuts down the power consumption of at least one of the computing nodes to a first node power consumption upper limit according to the first sum upper limit of the node power consumptions.

After cutting down the power consumption of at least one of the computing nodes to a first node power consumption upper limit, the chassis management control obtains the maximum auxiliary power consumption within a designated time period; after the designated time period passes, the chassis management control determines whether the maximum auxiliary power consumption within the designated time period is smaller than the maximum auxiliary power consumption before the time period; and if yes, the chassis management control obtains a second sum upper limit of the node power consumptions according to the maximum auxiliary power consumption within the designated time period and adjusts the power consumption of the at least one of the computing node to a second node power consumption upper limit according to the second sum upper limit of the node power consumptions.

In one embodiment, the chassis management control equally distributes the first sum upper limit of the node power consumptions to the computing nodes.

In one embodiment, the computing nodes are categorized into a primary group and a secondary group, and the chassis management control obtains a difference between the first sum upper limit of the node power consumptions and the real-time node power consumptions of the primary group and equally distributes the difference to the secondary group.

In one embodiment, if all the power-supplying units recover from being malfunctioned, the chassis management control stops cutting down the power consumption of the at least one of the computing nodes to the first node power consumption upper limit.

In one embodiment, when one of the power-supplying units is malfunctioned and the sum of the real-time power outputs is not larger than the renewed maximum sum of the power outputs, the chassis management control maintains the real-time node power consumption of each of the computing nodes.

In one embodiment, the computing nodes are categorized into a primary group and a secondary group, and the chassis management control determines whether a power control mode is enabled; when the power control mode is enabled, the chassis management control obtains a difference between the first sum upper limit of the node power consumptions and the real-time node power consumptions of the primary group and equally distributes the difference to the secondary group; when the power control mode is not enabled, the chassis management control equally distributes the first sum upper limit of the node power consumptions to the primary group and the secondary group.

In one embodiment, each of the power-supplying units continuously issues a normal status signal, and when the normal status signal is interrupted, the chassis management control determines that the corresponding power-supplying unit is malfunctioned.

In one embodiment, each of the power-supplying units issues an abnormal status signal when the power-supplying unit is malfunctioned, and the chassis management control determines that the power-supplying unit is malfunctioned after receiving the abnormal status signal.

According to the method for system power management and the computing system of this disclosure, power supply status and power consumption status in the computing system are detected and recorded instantaneously. When anyone of the power-supplying units is malfunctioned, the chassis management control is able to precisely and immediately calculate an adjustment in total power consumption and optionally reduces the node power consumption of the computing node that has low operation loading and remains node power consumptions of the other computing nodes. Therefore, the overall processing performance of the computing system can be maintained after the malfunctioned power-supplying unit is disabled and switched to off-line, and system stability of the computing system is enhanced.

BRIEF DESCRIPTION OF THE DRAWINGS

The disclosure will become more fully understood from the detailed description given herein below for illustration only, and thus not limitative of the disclosure, wherein.

DETAILED DESCRIPTION OF THE INVENTION

Figure 1:
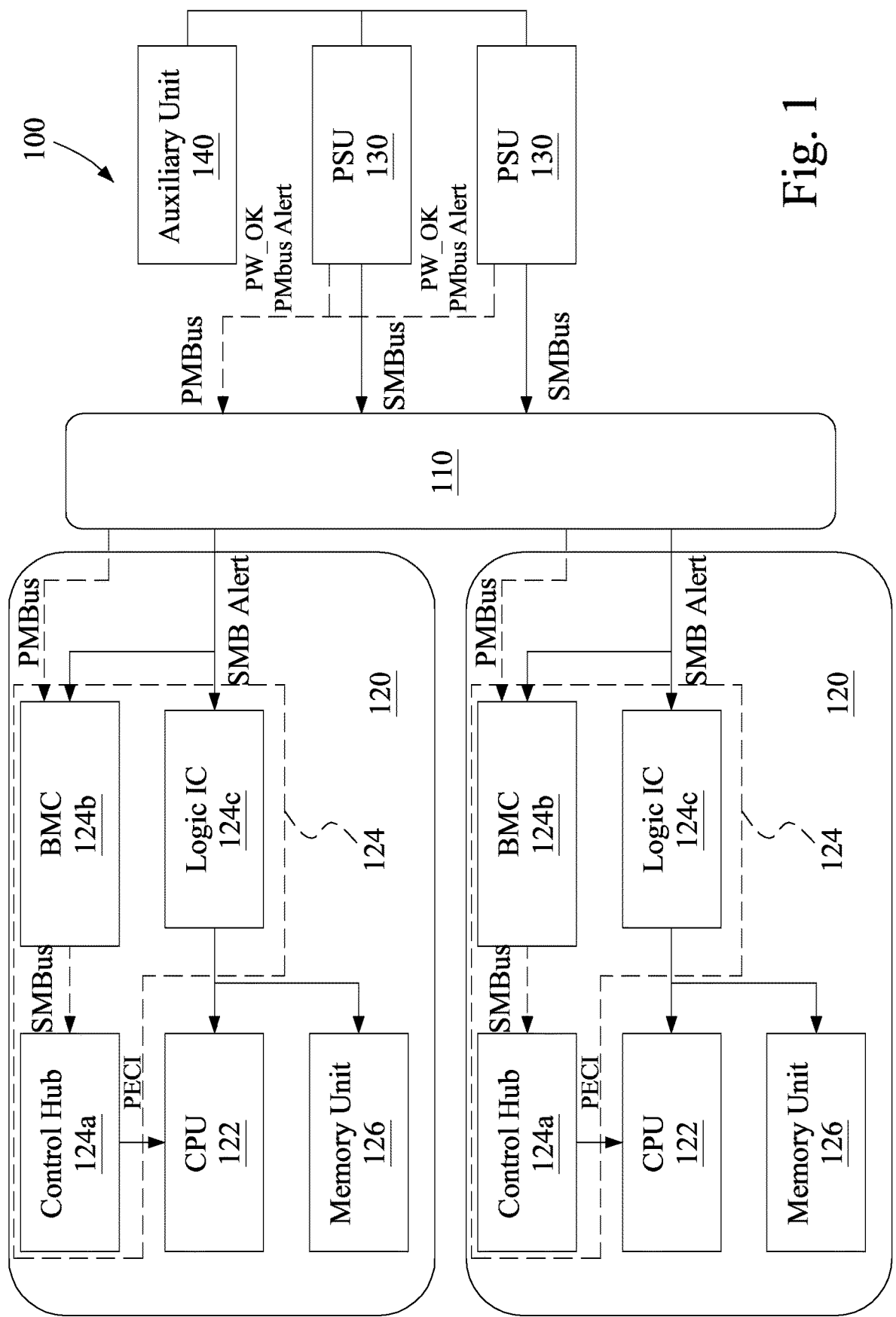
FIG. 1 is a circuit block diagram of a computing system according to a first embodiment of this disclosure.

Please refer to FIG. 1, which is a circuit block diagram of a computing system 100 according to a first embodiment of this disclosure, configured to perform a method for system power management. The computing system 100 includes a CMC 110 (chassis management control), a plurality of computing nodes 120, a plurality of PSUs 130 (power-supplying units), and at least one auxiliary unit 140.

As shown in FIG. 1, the computing nodes 120 are respectively equipped with data processing function to provide one or more services of the computing system 100. Each of the computing nodes 120 is electrically connected to the CMC 110 to be managed and controlled by the CMC 110, to assign data processing threads and allocate system resource to the computing nodes 120.

As shown in FIG. 1, the computing nodes 120 are electrically connected to the PSUs 130 to obtain electricity required. Usually, a computing node 120 includes a computer motherboard and a computer case containing the computer motherboard, and is disposed in a cabinet of the computing system 100 and able to be swapped. The computing node 120 includes a central processing unit 122 (CPU), a system logic chipset 124, memory units 126 and necessary data buses. The aforementioned data buses include but not limited to SMBus (System Management Bus), PMBus (Power Management Bus) and PECI (Platform Environmental Control Interface).

The system logic chipset 124 shown in FIG. 1 is an example, which includes a control hub 124a, a board management control 124b (BMC) and a logic IC 124c. The control hub 124a is, but not limited to, a combination of a south bridge and north bridge, a platform control hub (PCH), a memory controller hub (MCH), an I/O control hub (ICH), or an AMD Fusion controller hub. The system logic chipset 124 shown in FIG. 1 is an example rather than a limitation to the implementation of the system logic chipset 124. Generally, an electronic chip configured to handle I/O among the CPU 122 and other devices is the system logic chipset 124.

As shown in FIG. 1, each of the computing nodes 120 is electrically connected to the CMC 110 via SMBus, PMBus or data bus adapted to other protocol, so as to connect an external node via the CMC 110. Meanwhile, The CMC 110 controls the computing nodes 120, to allocate system resource to the computing nodes 120.

In an example, the computing system 100 executes plural service programs, each service program is handled by a group of computing nodes 120, and each group includes one or more computing nodes 120.

As shown in FIG. 1, the PSUs 130 respectively provide electricity, and each of the PSUs 130 includes an individual maximum power output. The PSU 130 returns parameters at least including an individual maximum power output, an individual real-time power output, and a normal status signal (PW_OK) to the CMC 110 via PMBus. The parameters are also transferred to the system logic chipset 124 within each of the computing nodes 120. The individual maximum power output is a maximum value of the power output of an individual PSU 130. And the individual maximum power outputs of the plural PSUs 130 are added up to a maximum sum of the power outputs of the plural PSUs 130. And the real-time power outputs of the plural PSUs 130 are added up to a real-time total power output of the plural PSUs 130.

Generally, the maximum sum of the power outputs is equal to the maximum power consumption of the computing system 100. In an actual system design, the PSUs 130 are directly purchased from the commercial market and are not custom made for the power consumption of the computing system 100. Therefore, the maximum sum of the power outputs is usually set to be larger than the maximum power consumption of the computing system 100, to simplify the system design process.

For example, a common computing system 100 is equipped two identical PSUs 130. When the maximum power consumption of the computing system 100 is 3000 W. A PSU 130 able to be directly purchased from the commercial market delivers a maximum power output of 1200 W, 1600 W, and 2000 W, two PSU 130 delivering an individual maximum power output of 1600 W would be used. The maximum sum of the power outputs will reach 3200 W that is slightly larger than the maximum power consumption 3000 W of the computing system 100. As a result, the arrangement of the PSUs 130 fulfils the maximum power consumption 3000 W required by the computing system 100 and the arrangement of the PSUs 130 is not over-designed.

As shown in FIG. 1, the auxiliary unit 140 obtains the electricity from the PSUs 130, and the auxiliary unit 140 includes a real-time auxiliary power consumption and a maximum auxiliary power consumption. In the computing system 100, usually the CMC 110 is not able to obtain the real-time auxiliary power consumption and the maximum auxiliary power consumption of the auxiliary unit 140 via data buses.

In the computing system 100, a device, which is not a part of the CMC 120 or a part of the computing node 120 is an auxiliary unit 140. The auxiliary unit 140 includes, but not limited to, an HDD array, a fan array, a reader of removal storage mediums, an expansion card (PCI Express card, PCIe card, etc.) on a data bus slot, or the combination thereof. The auxiliary unit 140 is electrically connected to a circuit via a data bus slot (PCI Express slot, PCIe slot, etc.) and then is connected to the CMC 110 via a connection interface. It should be noted that sometimes an individual HDD or fan is directly disposed within the computing node 120 and directly obtains electricity from a data bus of the computing node 120, such a HDD or fan is a part of the computing node 120 and is not an auxiliary unit 140. In this embodiment, the combination of a HDD array and a fan array independent from the computing node 120 is illustrated as an example of the auxiliary unit 140.

As shown in FIG. 1, the CMC 110 is electrically connected to and controls the PSUs 130 and the computing nodes 120 to obtain the maximum sum of the power outputs, the sum of the real-time power outputs, and the sum of the real-time power consumption. The CMC 110 applies a difference between the sum of the real-time power outputs and the sum of the real-time power consumption as the real-time auxiliary power consumption. The difference between the sum of the real-time power outputs and the sum of the real-time power consumptions is the real-time auxiliary power consumption. The CMC 110 continuously obtains the latest real-time auxiliary power consumption, and continuously updates the maximum auxiliary power consumption according the variation of the real-time auxiliary power consumption.

Figure 2:
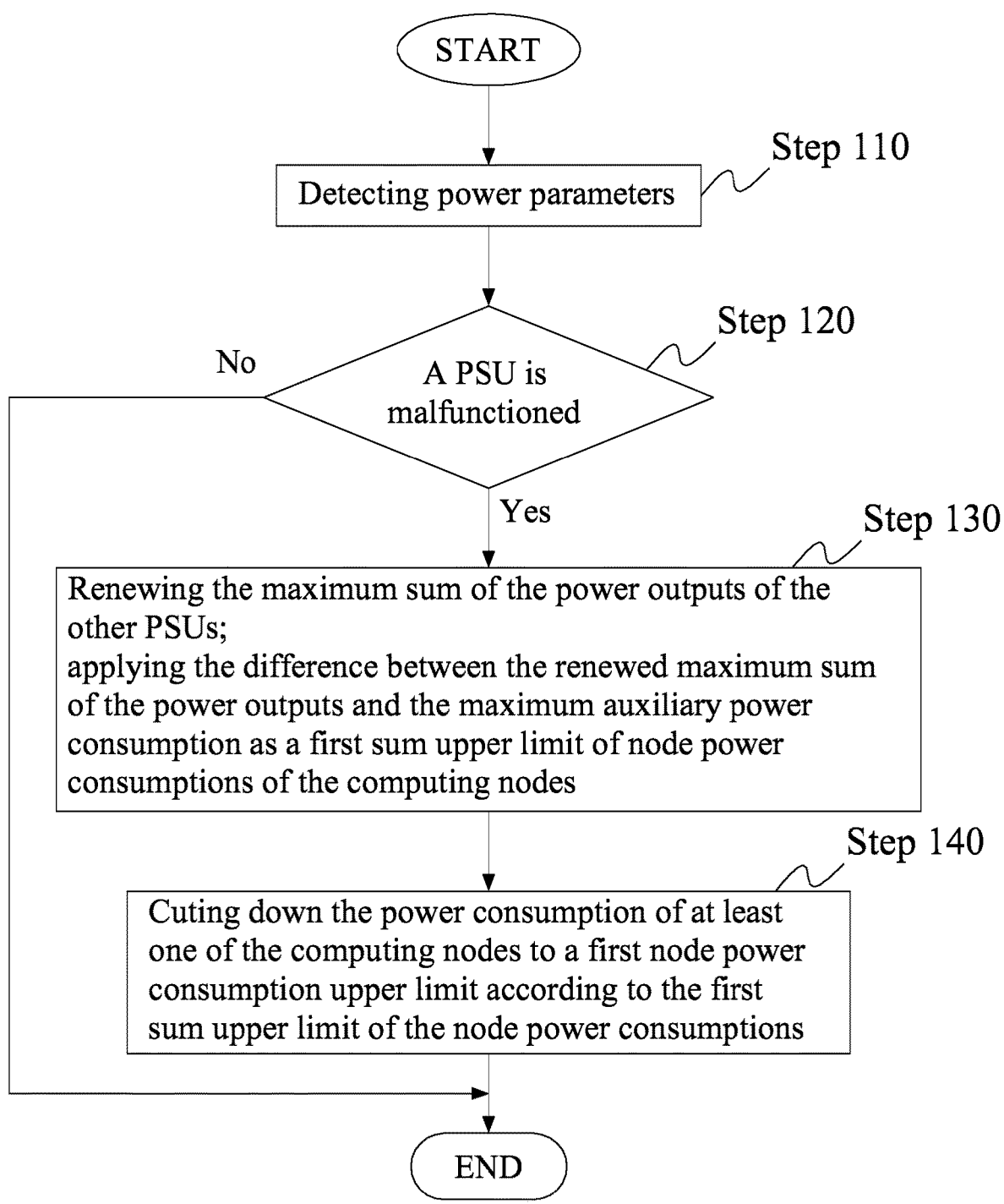
FIG. 2 and FIG. 3 are flow chart of a method for system power management according to the first embodiment of this disclosure.
Figure 3:
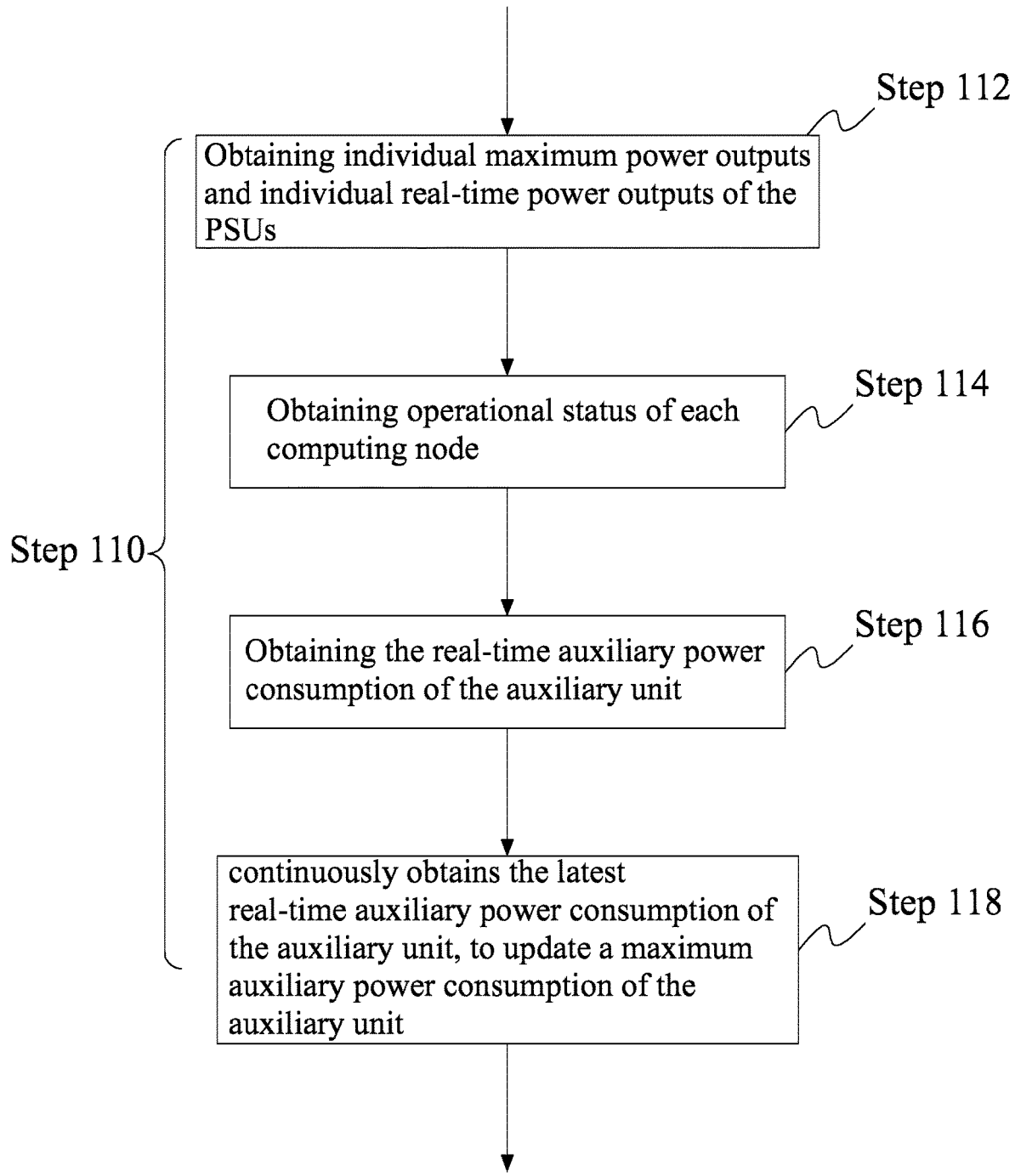

FIG. 2 and FIG. 3 show flow charts of the method for system power management according to the first embodiment.

As shown in FIG. 1 and FIG. 2, after the computing system 100 is powered up, the CMC 110 detects power parameters at first, as shown in Step 110. Detecting power parameters in this step is to obtain parameters with regarding to power outputs and power consumptions.

As shown in FIG. 1 and FIG. 3, the parameters obtained by the CMC 110 in Step 110 are described hereinafter. The order to be described is not to limit the order to obtain each parameter; order to obtain can be changed at will.

The CMC 110 obtains power information of each PSU 130, including hardware information, firmware information, and real-time operational status via PMBus. Therefore, the CMC 110 obtains individual maximum power outputs and individual real-time power outputs of the PSUs 130, as shown in Step 112.

Meanwhile, through connection established by PMBus, each PSU 130 continuously returns a normal status signal (PW_OK) to the CMC 110. When the normal status signal is interrupted, the CMC 110 determines that the corresponding PSU 130 is malfunctioned.

In step 112, detecting individual maximum power outputs of the PSUs 130 can be a part of system initializing process when the computing system 100 is powered on. During system initializing, each PSU 130 returns power information including hardware information, firmware information, and real-time operational status to CMC 110, so that the CMC 110 obtains the individual maximum power output of each PSU 130 after the CMC 110 is powered on. After obtaining the individual maximum power output of each PSU 130, the CMC 110 adds up the individual maximum power outputs to obtain the maximum sum of power outputs all the PSUs 130, and the value with regarding to is recorded to an address space of a data buffer of the CMC 110. Similarly, after obtaining the individual real-time power output of each PSU 130, the CMC 110 adds up the real-time power outputs to obtain the sum of the real-time power outputs of all the PSUs 130, and the value with regarding to is recorded to another address space.

As shown in FIG. 1 and FIG. 3, similarly, through connection established by PMBus or other data bus, the CMC 110 obtains operational status of each computing node 120, including the real-time node power consumption of each computing node 120, as shown in Step 114. As described above, the CMC 110 is connected to the BMC 124b of each computing node 120 to obtain the real-time node power consumptions and maximum power consumptions, to add up the real-time node power consumptions to a sum of real-time total power consumptions of all the computing nodes 120.

The maximum power consumption of each computing node 120 is not necessarily equal to the maximum power consumption of the hardware of the computing node 120 can reach, the maximum power consumption is usually set to be smaller than the maximum hardware power consumption.

As shown in FIG. 1 and FIG. 3, after obtaining the aforementioned values, the CMC 110 calculates a difference between the sum of the real-time power output of the PSUs 130 and the sum of the real-time power consumption of the computing nodes 120, to obtain the real-time auxiliary power consumption of the auxiliary unit 140, as shown in Step 116.

As shown in FIG. 1 and FIG. 3, the CMC 110 continuously obtains the latest real-time auxiliary power consumption of the auxiliary unit 140, to update a maximum auxiliary power consumption of the auxiliary unit 140, as shown in Step 118.

The CMC 110 records the maximum auxiliary power consumption of the auxiliary unit 140 to a data buffer. To update the maximum auxiliary power consumption of the auxiliary unit 140, the CMC 110 records a first real-time auxiliary power consumption as the maximum auxiliary power consumption to the data buffer. Then, the CMC 110 continuously obtains a second real-time auxiliary power consumption of the auxiliary unit 140, and the CMC 110 compares the second real-time auxiliary power consumption with the maximum auxiliary power consumption recorded in the data buffer. When the second real-time auxiliary power consumption is larger than the recorded maximum auxiliary power consumption, the CMC 110 replaces the maximum auxiliary power consumption by the second real-time auxiliary power consumption to update the maximum auxiliary power consumption. When the second real-time auxiliary power consumption is not larger than the maximum auxiliary power consumption recorded in the data buffer, the CMC 110 remains the value recorded in the data buffer as the maximum auxiliary power consumption of the auxiliary unit 140.

As shown in FIG. 1 and FIG. 2, after obtaining the power parameters, the CMC 110 starts to monitor the operations of the PSUs 130, so as to detect whether a PSU 130 is malfunctioned, as shown in Step 120.

As shown in FIG. 1 and FIG. 2, the PSU 130 also executes self-monitoring, and when the input or the output is abnormal, such as unstable output or unable to raise output power, the PSU 130 generates a signal variation with regarding to the malfunction status on pins of the connection interface. The CMC 110 establishes connection with the PSUs 130 via through connection established by PMBus or other data bus, and detects whether a PSU 130 is malfunctioned according to the signal variations on the pins of the connection interface, as shown in Step 120.

As described above, one approach to malfunction detection is that the CMC 110 issues an status-acquiring signal through an unused pin of PMBus. Each PSU 130 returns a normal status signal (PW_OK) in response to the status-acquiring signal, and the CMC 110 receives the normal status signal (PW_OK) of the PSU 130 through the unused pin of PMBUs. When the normal status signal (PW_OK) is interrupted the CMC 110 determines that the corresponding PSU 130 is malfunctioned. In another example, the malfunction detection is to detect status of the data pin and clock signal pin, each PSU 130 continuously issues the normal status signal, and the CMC 110 receives the normal status signal of the PSU 130 through the data pin and the clock signal pin. The abovementioned malfunction detections can be performed simultaneously.

Another approach of malfunction detection can be adapted to a programmable PSU 130. When the PSU 130 is malfunctioned, the PSU 130 issues a PMBus alert as an alert message to the CMC 110 via PMBus, the CMC 110 determines that the PSU 130 is malfunctioned after receiving the alert message. Malfunction events include Over-Temperature, Over-Voltage, Under-Voltage, Over-Current, cooling fan fault, etc.

As shown in FIG. 1 and FIG. 2, when one of the PSUs 130 is malfunctioned the CMC 110 renews the maximum sum of the power outputs of the other PSUs 130. The CMC 110 applies the difference between the renewed maximum sum of the power outputs and the maximum auxiliary power consumption as a first sum upper limit of node power consumptions of the computing nodes 120, as shown in Step 130.

As shown in FIG. 1 and FIG. 2, finally, The CMC 110 cuts down the power consumption of at least one of the computing nodes 120 to a first node power consumption upper limit according to the first sum upper limit of the node power consumptions, as shown in Step 140.

The power consumption of one of the computing node 120 is cut off to the first node power consumption upper limit according to the variation of the maximum sum of the power outputs of the PSUs 130. The maximum power consumption of the computing system 100 being adjusted will not excess the renewed maximum sum of the power outputs of the other PSUs 130. When power consumptions of plural computing nodes 130 are going to be adjusted, the power consumption adjustment is equally distributed to the plural computing nodes 120. That is, the difference between the first sum upper limit of the node power consumptions and the node power consumptions of the other computing nodes 120 is equally distributed to the computing nodes 120 to be adjusted.

The power consumption adjustment is to estimate how much power output can supply to the computing nodes 120 after the malfunctioned PSU 130 is switched to off-line, and then to cut the power consumption of a designated computing node 120 or a designated group of computing nodes 120, such that the renewed maximum sum of the power outputs of the functional PSUs 130 can fulfil the power requirement of the computing system 100, and part of the computing nodes 120 can remain original performances.

In other word, in this disclosure only part of computing nodes 120 are adjusted, not all computing nodes 120 are switched to low power mode, and the system performance is remained as possible when one or more PSUs 130 cannot work. In particular, high-loading nodes, such as the computing nodes 120 serve as a file server, remain original power mode, and low-utilization nodes, such as the computing nodes 120 serve as a user account management server, is selectively switched to low power mode. Therefore, according to the computing system 100, when power supply is malfunctioned, only part of computing nodes 120 is selected to be underclocked, and overall system performance will not be cut down rapidly, to temporarily maintain the system stability of the computing system 100.

Figure 4:
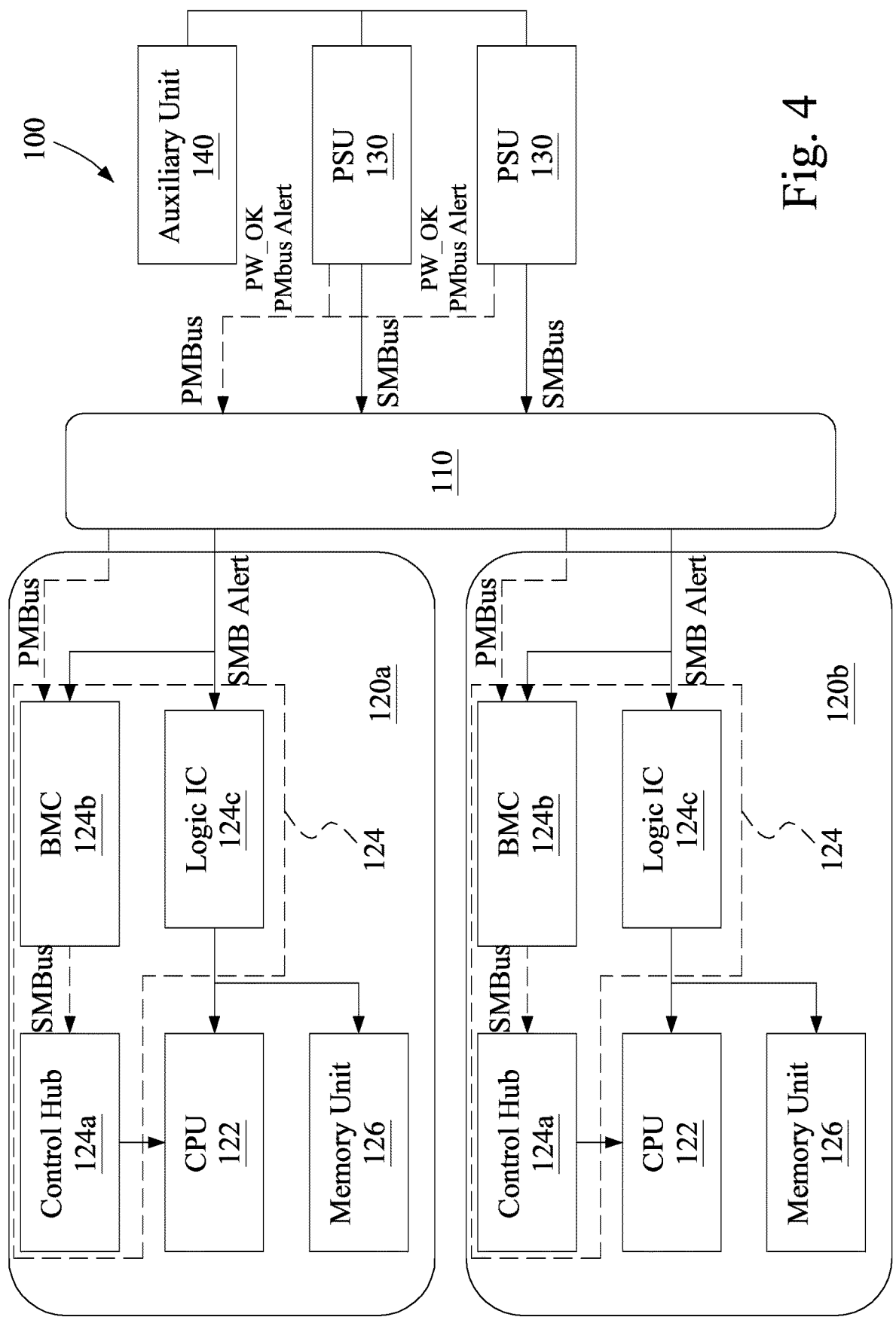
FIG. 4 is a circuit block diagram of a computing system according to a second embodiment of this disclosure.

Please refer to FIG. 4, which is a circuit block diagram of a computing system 100 according to a second embodiment of this disclosure, configured to perform the method for system power management. The computing system 100 in the second embodiment is the same as that disclosed in the first embodiment, and the difference lies in that the computing nodes 120a, 120b are categorized to perform precisely power management.

As shown in FIG. 4, the computing nodes 120a, 120b are categorized into a primary group and a secondary group. The primary group includes at least one computing node 120a, and the secondary group includes at least one computing node 120b. The primary group and the secondary group in FIG. 4 respectively include one computing node 120a and one computing node 120b are illustrated as examples and not to limit the number of computing nodes in each group. In fact, the primary group and the secondary group may respectively include plural computing nodes 120a and plural computing nodes 120b. The grouping principle of the primary group and the secondary group are based on average working load of each computing node. The computing node 120a having heavier working load is categorized into the primary group, and the computing node 120b having lighter working load is categorized into the secondary group. For example, in a file server, the computing node 120a provides file access service is categorized into the primary group, and the computing node 120b managing user account information is categorized into secondary group.

Please refer to FIG. 5 to FIG. 9, which shows flow charts of a method for system power management according to a second embodiment of this disclosure.

Figure 5:
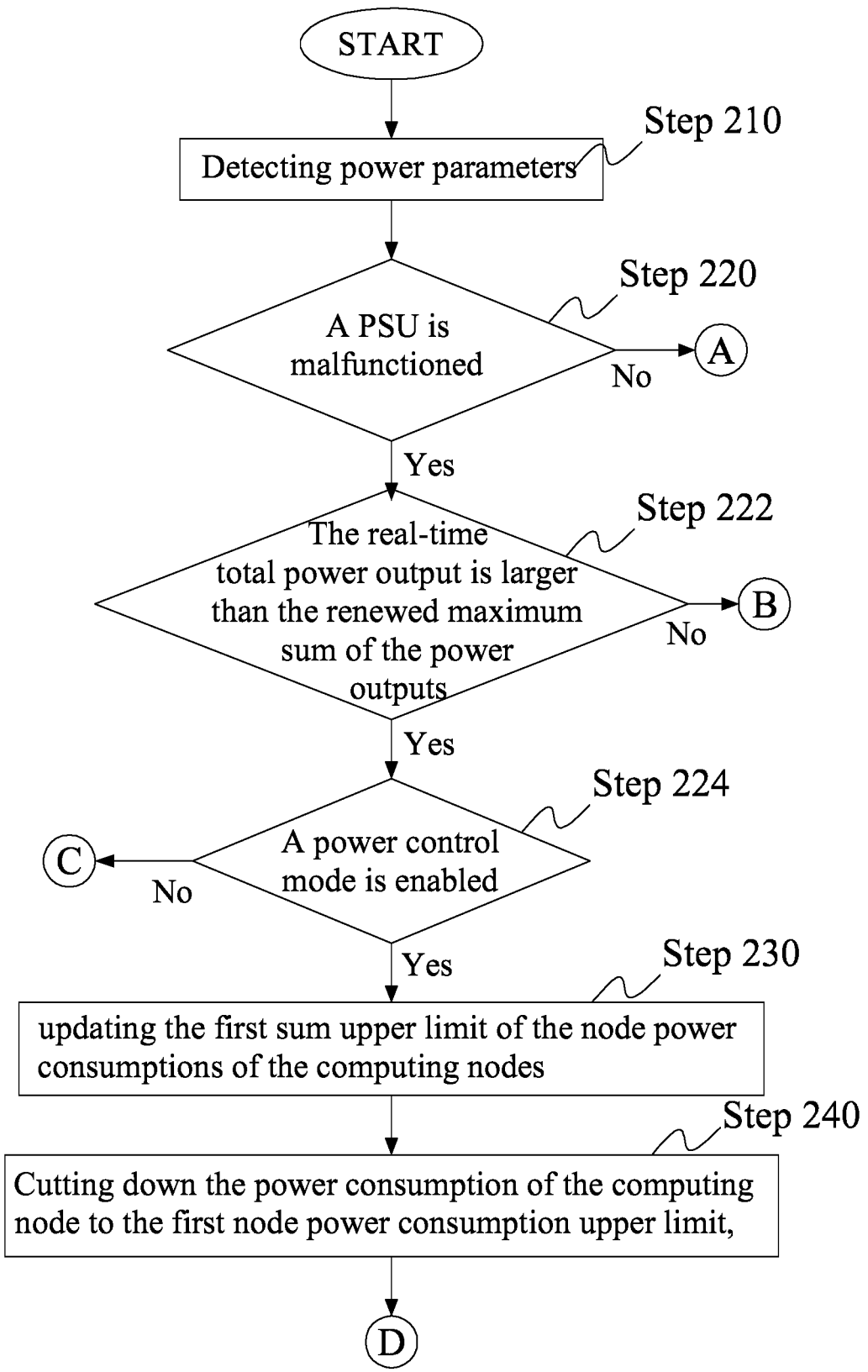
FIG. 5 to FIG. 9 are flow charts of a method for system power management according to the second embodiment of this disclosure.

As shown in FIG. 5, the method of the second embodiment is to detect power parameters at first by using the CMC 110, as shown in Step 210.

In Step 210, the CMC 110 detects a maximum sum of the power outputs of a plurality of PSUs 130 at first. Then the CMC 110 obtains the real-time power outputs of the PSUs 130 and the sum of the real-time power consumption of the computing nodes 120a, 120b. The CMC 110 applies a difference between the sum of the real-time power outputs and the sum of the real-time total power consumption to obtain the real-time auxiliary power consumption of an auxiliary unit 140. The CMC 110 continuously obtains the latest real-time auxiliary power consumption, to update a maximum auxiliary power consumption of the auxiliary unit 140, the step 210 of the second embodiment is approximately identical to the step 110 of the first embodiment, and the detail is omitted hereinafter.

As shown in FIG. 5, after obtaining the power parameters, the CMC 110 starts to monitor the operations of the PSUs 130, and detects whether a PSU 130 is malfunctioned, as shown in Step 220.

Figure 6:
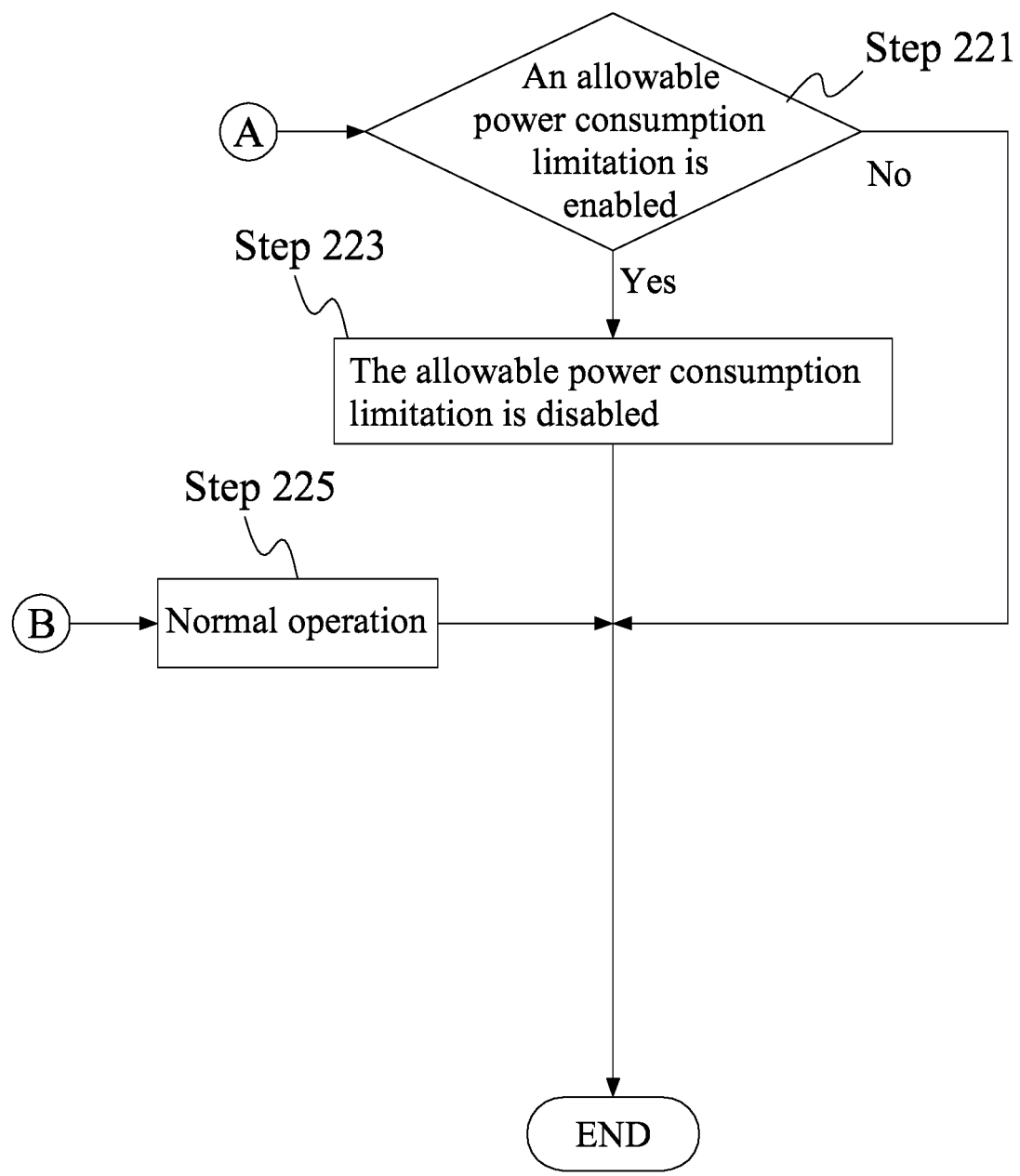

Please refer to FIG. 5 and FIG. 6, if all the PSUs 130 recover from being malfunctioned, the CMC 110 further determines whether an allowable power consumption limitation is enabled, that is, the CMC 110 determines whether any computing node 120a, 120b is adjusted to lower the power consumption thereof to the first node power consumption upper limit. If there is a computing node 120a, 120b being adjusted, the allowable power consumption limitation is disabled, the CMC 110 stops cutting down the power consumption of the computing node 120a, 120b to the first node power consumption upper limit and stops the power management, as shown in Step 221 and Step 223.

As shown in FIG. 5, when one of the PSUs 130 is malfunctioned, the CMC 110 renews the maximum sum of the power outputs of the other PSUs 130 and determines whether the real-time total power output is larger than the renewed maximum sum of the power outputs, as shown in Step 222.

As shown in FIG. 5 and FIG. 6, if the sum of the real-time power outputs is not larger than the renewed maximum sum of the power outputs, the computing system 100 remains normal operation and does not limit or cut down the power consumption of any computing node 120a, 120b, as shown in Step 225, and terminates the power management.

As shown in FIG. 5, if the sum of the real-time power outputs is larger than the renewed maximum sum of the power outputs, the CMC 110 further determines whether a power control mode is enabled, as shown in Step 224. The power control mode is usually recorded in setting value addresses of a BIOS of the computing system 110; if the value is TRUE, the power control mode is enabled; if the value is FALSE, the power control mode is disabled.

As shown in FIG. 5, when the power control mode is enabled, the CMC 110 applies a difference between the renewed maximum sum of the power outputs of the other PSUs 130 and the maximum auxiliary power consumption of the auxiliary unit 140, to update the first sum upper limit of the node power consumptions of the computing nodes 120a, 120b, as shown in Step 230.

In Step 230, the power consumption of the computing node 120a of the primary group is not adjusted, and the CMC 110 applies a difference between first sum upper limit of the node power consumptions and the real-time node power consumption of the primary group and equally distributes the difference to each computing node 120b of the secondary group.

As shown in FIG. 5, finally, according to the first sum upper limit of the node power consumptions, the CMC 110 set a first node power consumption upper limit for each computing node 120b of the secondary group, and cuts down the power consumption of the computing node 120b to the first node power consumption upper limit, as shown in Step 240. A common approach is to apply a difference between the first sum upper limit of the node power consumption and the allowable power consumption of the computing node 120a of the primary group, and equally distribute the difference to each computing node 120b of the secondary group to be the first node power consumption upper limit.

When the real-time node power consumption of the computing node decreases, the maximum auxiliary power consumption of the auxiliary unit 140, such as the power consumption of an HDD array or fan array, also decreases. That is, when the power consumption of one or more computing nodes 120 is cut down to the first node power consumption upper limit, the maximum auxiliary power consumption of the auxiliary unit lowers down simultaneously.

In this regard, this disclosure further discloses a release procedure to release part of power consumption reserved quota to the computing nodes 120.

Figure 7:
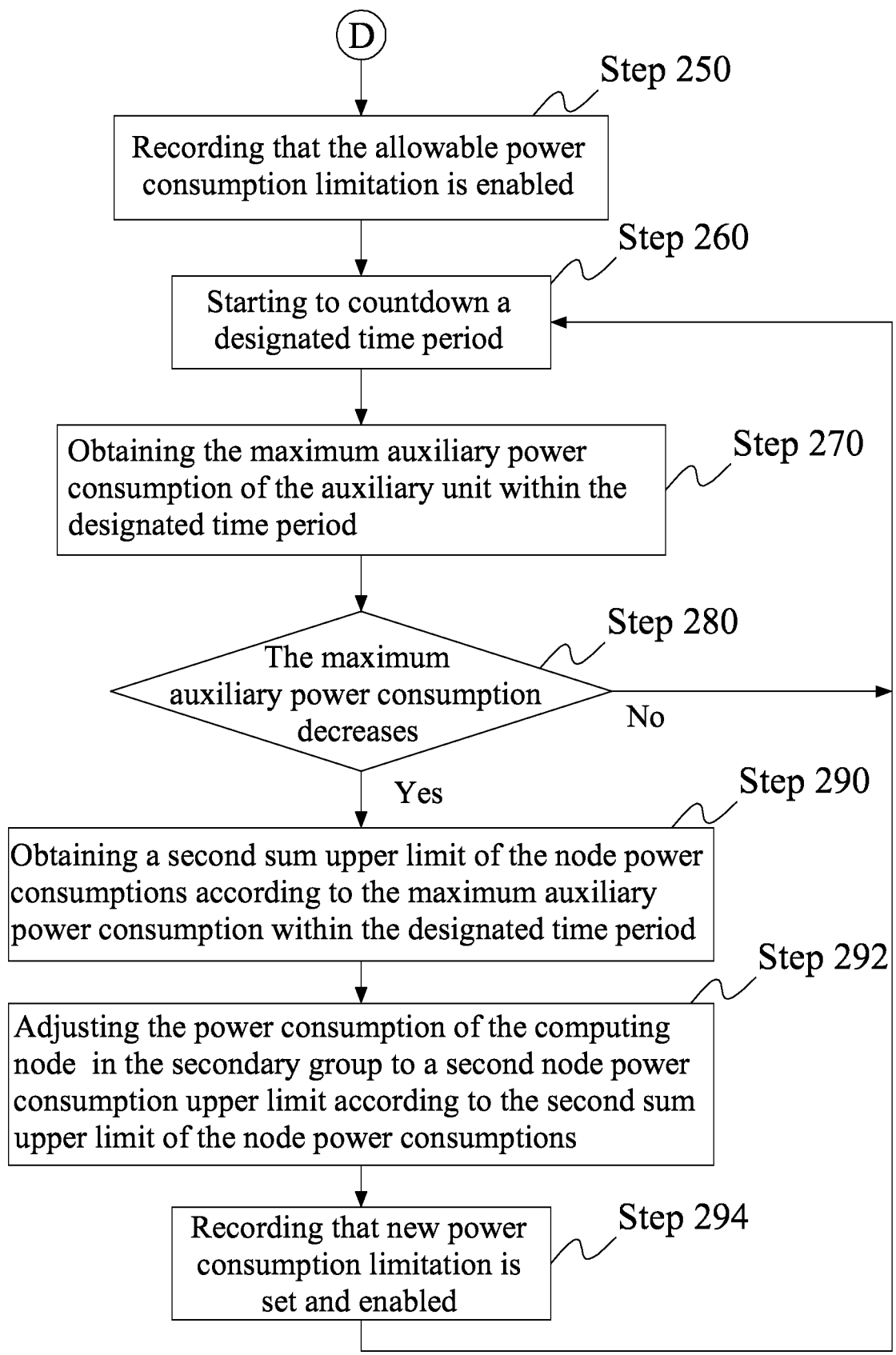

Please refer to FIG. 7, which shows a flow chart of the release procedure of the method for system power management of this disclosure.

As shown in FIG. 7, after Step 240, the CMC 110 records that the allowable power consumption limitation is enabled, as shown in Step 250.

Figure 8:
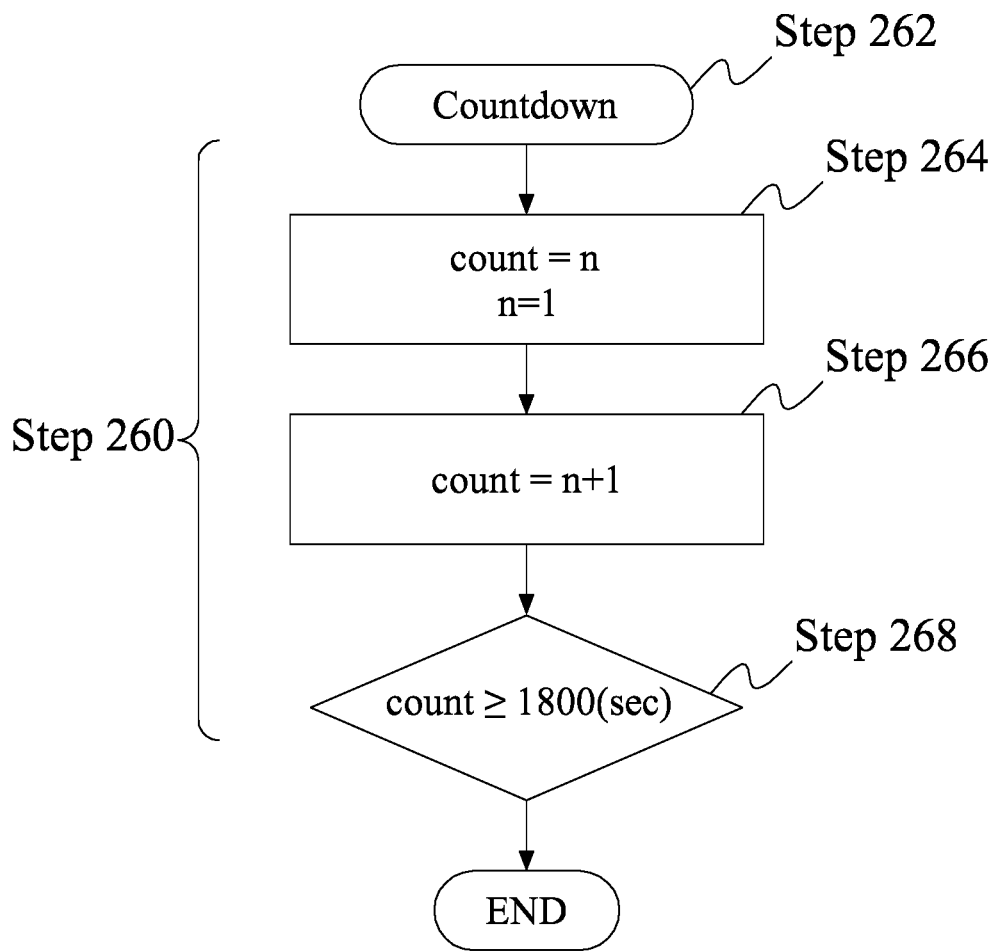

As shown in FIG. 7 and FIG. 8, after the power consumption of the computing node 120b is cut down to the first node power consumption upper limit, namely the allowable power consumption limitation is enabled, the CMC 110 starts to countdown a designated time period T, and enters the next step after designated time period T passes, as shown in Step 260.

Please refer to FIG. 7 and FIG. 8, in an example, the auxiliary unit 140 includes at least one fan. The reason why to countdown the designated time period T is that after the power consumption of the at least one computing node 120 is cut down to the first node power consumption upper limit, the heat generation rate of the adjusted computing node 120 decreases and a new thermal equilibrium occurs in the computing system 100. The designated time period T is required for the new thermal equilibrium, and the operation of the fan also changed with the new thermal equilibrium. Generally, the fan requires 30 minutes (1800 seconds) to achieve the new thermal equilibrium. At this time, the maximum auxiliary power consumption of the auxiliary unit 140 (the fan) decreases, and now the PSUs 130 have redundant power output capability to be distributed the computing nodes 120. The countdown procedure is shown as Step 262 to Step 268 in FIG. 8.

As shown in FIG. 7, The CMC 110 detects power parameters again to obtain the maximum auxiliary power consumption of the auxiliary unit 140 within the designated time period T, as shown in Step 270.

As shown in FIG. 7, after the designated time period T passes, the CMC 110 determines whether the maximum auxiliary power consumption within the designated time period T is smaller than the maximum auxiliary power consumption before the time period T; that is, the CMC 110 determines whether the maximum auxiliary power consumption of the auxiliary unit 140 decreases after the designated time period T passes, as shown in Step 280.

As shown in FIG. 7, if the maximum auxiliary power consumption within the designated time period T is smaller than the maximum auxiliary power consumption before the designated time period T, the PSUs 130 have redundant power output capability to be distributed the computing nodes 120. At this time, the CMC 110 obtains a second sum upper limit of the node power consumptions according to the maximum auxiliary power consumption within the designated time period T, as shown in Step 290.

As shown in FIG. 7, then the CMC 110 adjusts the power consumption of the computing node 120b in the secondary group to a second node power consumption upper limit according to the second sum upper limit of the node power consumptions, as shown in Step 292. Then the CMC 110 records that new power consumption limitation is set and enabled, as shown in Step 294. Finally, the process returns to Step 260 to countdown again.

Figure 9:
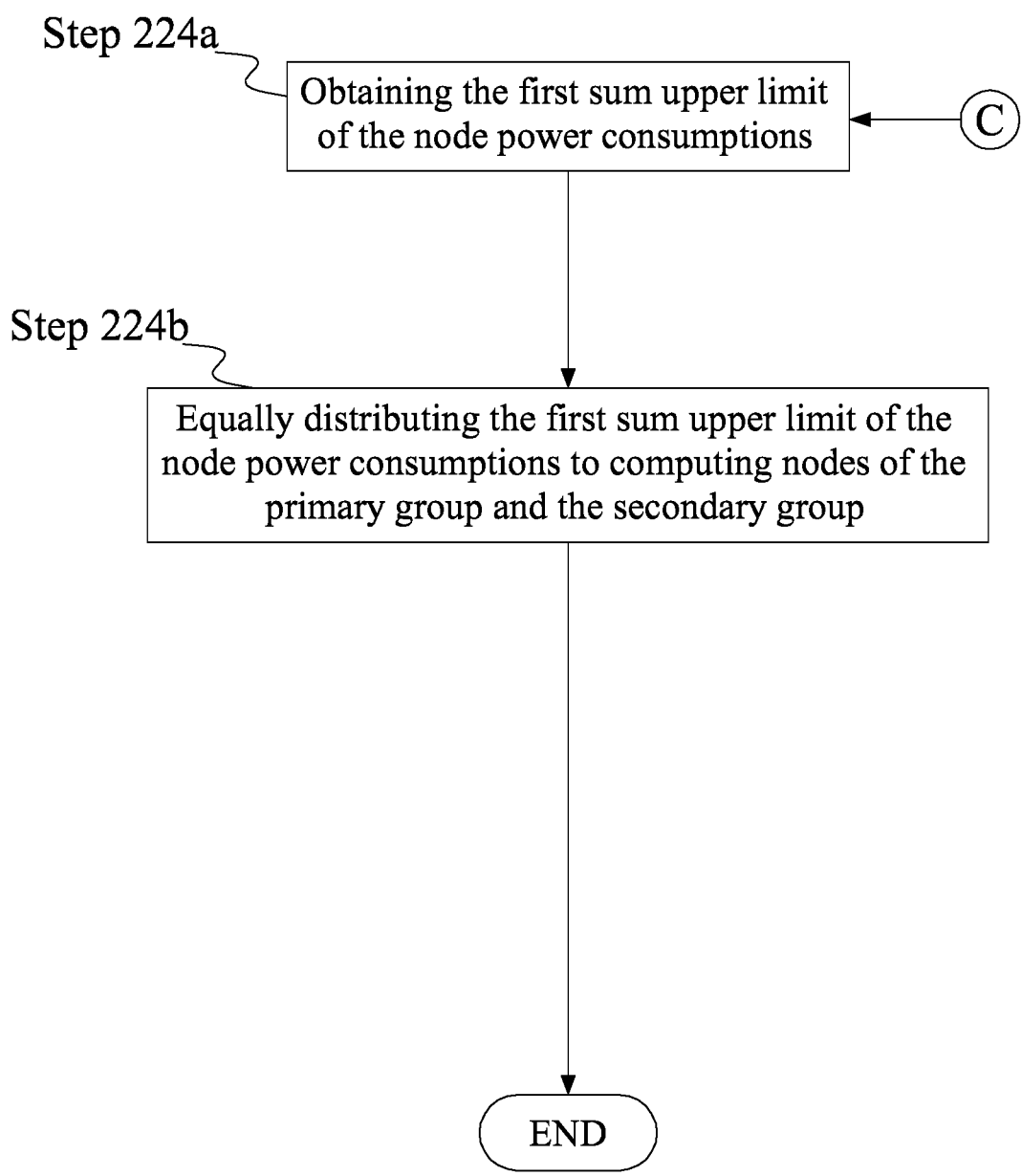

Please refer to FIG. 5 and FIG. 9, If in Step 224 the power control mode is not enabled, the CMC 110 still adjust the power consumption of the computing node 120. At this time, the CMC 110 calculates the first sum upper limit of the node power consumptions, namely applies a difference between the renewed maximum sum of the power outputs and the maximum auxiliary power consumption of the auxiliary unit 140 to obtain the first sum upper limit of the node power consumptions, as shown in Step 224a. Then the CMC 110 equally distributes the first sum upper limit of the node power consumptions to computing nodes 120a, 120b of the primary group and the secondary group to be the first node power consumption upper limit of each of the computing nodes 120a, 120b, as shown in Step 224b. Finally, the CMC 110 terminates the power management process.

Power supply status and power consumption status in the computing system 100 are detected and recorded instantaneously. Therefore, When any one of the PSUs 130 is malfunctioned, the CMC 110 is able to precisely and immediately calculates an adjustment in total power consumption and optionally reduces a node power consumption of the computing node 120/120b which has low operation loading and remains the node power consumptions of the other computing nodes 120/120b. The overall processing performance of the computing system 100 can be maintained after the malfunctioned PSU 130 is disabled and switched to off-line, and system stability of the computing system is enhanced.

What is claimed is:

1. A method for system power management, comprising:
   detecting a maximum sum of power outputs of a plurality of power-supplying units;
   respectively detecting an individual real-time power output of each of the power-supplying units and a real-time node power consumption of each of a plurality of computing nodes, adding up the individual real-time power outputs to a sum of real-time power outputs and adding up the real-time node power consumptions to a sum of real-time power consumptions, and applying the difference between the sum of the real-time power outputs and the sum of the real-time power consumptions as a real-time auxiliary power consumption of an auxiliary unit;

continuously obtaining the real-time auxiliary power consumption to update a maximum auxiliary power consumption of the auxiliary unit; wherein updating the maximum auxiliary power consumption comprising:

recording a first real-time auxiliary power consumption of the auxiliary unit as the maximum auxiliary power consumption and continuously obtaining a second real-time auxiliary power consumption of the auxiliary unit; and comparing the second real-time auxiliary power consumption with the maximum auxiliary power consumption, and replacing the maximum auxiliary power consumption by the second real-time auxiliary power consumption when the second real-time auxiliary power consumption is larger than the maximum auxiliary power consumption;

detecting whether each of the power-supplying units is malfunctioned;

when one of the power-supplying units is malfunctioned, renewing the maximum sum of the power outputs of the other power-supplying units;

applying the difference between the remaining renewed maximum sum of the power outputs and the maximum auxiliary power consumption as a first sum upper limit of the node power consumptions of the computing nodes; and according to the first sum upper limit of the node power consumptions, cutting down the power consumption of at least one of the computing nodes to a first node power consumption upper limit;

wherein after cutting down the power consumption of the at least one of the computing nodes to the first node power consumption upper limit, the method further comprises:

obtaining the maximum auxiliary power consumption of the auxiliary unit within a designated time period;

after the designated time period, determining whether the maximum auxiliary power consumption within the designated time period is smaller than the maximum auxiliary power consumption before the designated time period;

if yes, obtain a second sum upper limit of the node power consumptions according to the maximum auxiliary power consumption within the designated time period; and according to the second sum upper limit of the node power consumptions, adjusting the node power consumption of the at least one of the computing nodes to a second node power consumption upper limit.

2. The method as claimed in claim 1, wherein cutting down the power consumption of the at least one of the computing nodes to the first node power consumption upper limit comprising:

equally distributing the first sum upper limit of the node power consumptions to the computing nodes.

3. The method as claimed in claim 1, wherein cutting down the power consumption of the at least one of the computing nodes to the first node power consumption upper limit comprising:

categorizing the computing nodes into a primary group and a secondary group; and applying a difference between the first sum upper limit of the node power consumptions and the real-time node power consumptions of the primary group and equally distributing the difference to the secondary group.

4. The method as claimed in claim 1, wherein if all the power-supplying units recover from being malfunctioned, stopping cutting down the power consumption of the at least one of the computing nodes to the first node power consumption upper limit.

5. The method as claimed in claim 1, wherein after one of the power-supplying units is malfunctioned, if the sum of the real-time power outputs is not larger than the renewed maximum sum of the power outputs, maintaining the real-time node power consumption of each of the computing nodes.

6. The method as claimed in claim 1, wherein cutting down the power consumption of the at least one of the computing nodes to the first node power consumption upper limit comprises:

categorizing the computing nodes into a primary group and a secondary group;

determining whether a power control mode is enabled;

when the power control mode is enabled, applying a difference between the first sum upper limit of the node power consumptions and the real-time node power consumptions of the primary group and equally distributing the difference to the secondary group; and when the power control mode is not enabled, equally distributing the first sum upper limit of the node power consumptions to the primary group and the secondary group.

7. The method as claimed in claim 1, wherein detecting whether each of the power-supplying units is malfunctioned comprises:

continuously receiving a normal status signal from each of the power-supplying units; and when the normal status signal is interrupted, determining the corresponding power-supplying unit is malfunctioned.

8. The method as claimed in claim 1, wherein detecting whether each of the power-supplying units is malfunctioned comprises:

the power-supplying unit issuing an abnormal status signal when the power-supplying unit is malfunctioned, and determining the power-supplying unit is malfunctioned after receiving the abnormal status signal.

9. A computing system comprising:

a plurality of power-supplying units respectively providing electricity; wherein each of the power-supplying units includes an individual maximum power output to be added up to a maximum sum of the power outputs, and each of the power-supplying units is arranged to return an individual real-time power output, and the individual real-time power outputs of the power-supplying units are added up to a sum of the real-time power outputs;

a plurality of computing nodes respectively equipped with data processing function and respectively obtaining the electricity from the power-supplying units, wherein each of the computing nodes is arranged to return a real-time power consumption to be added up as a sum of real-time power consumptions;

at least one auxiliary unit, obtaining the electricity from the power-supplying units, and including a real-time auxiliary power consumption and a maximum auxiliary power consumption; and a chassis management control, connected to and controlling the power-supplying units and computing nodes to obtain the maximum sum of the power outputs, the sum of real-time power outputs, and the sum of the real-time power consumptions; wherein the chassis management control applies a difference between the sum of the real-time power outputs and the sum of the real-time power consumptions as the real-time auxiliary power consumption, and continuously updating the maximum auxiliary power consumption according the variation of the real-time auxiliary power consumption;

wherein the chassis management control records a first real-time auxiliary power consumption of the auxiliary unit as the maximum auxiliary power consumption and continuously obtains a second real-time auxiliary power consumption of the auxiliary unit, and the chassis management control compares the second real-time auxiliary power consumption with the maximum auxiliary power consumption; when the second real-time auxiliary power consumption is larger than the maximum auxiliary power consumption, the chassis management control replaces the maximum auxiliary power consumption by the second real-time auxiliary power consumption;

wherein when the chassis management control detects that one of the power-supplying units is malfunctioned, the chassis management control renews the maximum sum of the power outputs of the other power-supplying units, as a first sum upper limit of the node power consumptions of the computing nodes; and cutting down the power consumption of at least one of the computing nodes to a first node power consumption upper limit according to the first sum upper limit of the node power consumptions;

wherein after cutting down the power consumption of at least one of the computing nodes to a first node power consumption upper limit, the chassis management control obtains the maximum auxiliary power consumption within a designated time period; after the designated time period passes, the chassis management control determines whether the maximum auxiliary power consumption within the designated time period is smaller than the maximum auxiliary power consumption before the time period; and if yes, the chassis management control obtains a second sum upper limit of the node power consumptions according to the maximum auxiliary power consumption within the designated time period and adjusts the power consumption of the at least one of the computing node to a second node power consumption upper limit according to the second sum upper limit of the node power consumptions.

10. The computing system as claimed in claim 9, wherein the chassis management control equally distributes the first sum upper limit of the node power consumptions to the computing nodes.

11. The computing system as claimed in claim 9, wherein the computing nodes are categorized into a primary group and a secondary group, and the chassis management control applies a difference between the first sum upper limit of the node power consumptions and the real-time node power consumptions of the primary group and equally distributes the difference to the secondary group.

12. The computing system as claimed in claim 9, wherein if all the power-supplying units recover from being malfunctioned, the chassis management control stops cutting down the power consumption of the at least one of the computing nodes to the first node power consumption upper limit.

13. The computing system as claimed in claim 9, wherein when one of the power-supplying units is malfunctioned and the sum of the real-time power outputs is not larger than the renewed maximum sum of the power outputs, the chassis management control maintains the real-time node power consumption of each of the computing nodes.

14. The computing system as claimed in claim 9, wherein the computing nodes are categorized into a primary group and a secondary group, and the chassis management control determines whether a power control mode is enabled;

when the power control mode is enabled, the chassis management control applies a difference between the first sum upper limit of the node power consumptions and the real-time node power consumptions of the primary group and equally distributes the difference to the secondary group; and when the power control mode is not enabled, the chassis management control equally distributes the first sum upper limit of the node power consumptions to the primary group and the secondary group.

15. The computing system as claimed in claim 9, wherein each of the power-supplying units continuously issues a normal status signal, and when the normal status signal is interrupted the chassis management control determines the corresponding power-supplying unit is malfunctioned.

16. The computing system as claimed in claim 9, wherein the power-supplying unit issues an abnormal status signal when the power-supplying unit is malfunctioned, and the chassis management control determines that the power-supplying unit is malfunctioned after receiving the abnormal status signal.

* * * * *